United States Patent
Ngahu

(10) Patent No.: US 10,239,411 B2
(45) Date of Patent: Mar. 26, 2019

(54) EXCESS-LENGTH-ABSORBING APPARATUS AND COIL UNIT

(71) Applicant: YAZAKI CORPORATION, Tokyo (JP)

(72) Inventor: Antony Ngahu, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 200 days.

(21) Appl. No.: 14/783,561

(22) PCT Filed: Apr. 15, 2014

(86) PCT No.: PCT/JP2014/060660
§ 371 (c)(1),
(2) Date: Oct. 9, 2015

(87) PCT Pub. No.: WO2014/171432
PCT Pub. Date: Oct. 23, 2014

(65) Prior Publication Data
US 2016/0059714 A1 Mar. 3, 2016

(30) Foreign Application Priority Data
Apr. 17, 2013 (JP) .................................. 2013-086310

(51) Int. Cl.
*H01F 38/14* (2006.01)
*B60L 11/18* (2006.01)
(Continued)

(52) U.S. Cl.
CPC ............... *B60L 11/182* (2013.01); *B60K 6/22* (2013.01); *H01F 38/14* (2013.01); *H02J 5/005* (2013.01);
(Continued)

(58) Field of Classification Search
CPC ....... B60L 11/182; H02J 7/0042; H02J 5/005; H02J 7/025; H02J 17/00; H01F 38/14;
(Continued)

(56) References Cited

U.S. PATENT DOCUMENTS 3,975,855 A * 8/1976 McKeown ............ A01K 87/08
43/23
4,980,663 A 12/1990 Moyer
(Continued)

FOREIGN PATENT DOCUMENTS

JP 5-6818 A 1/1993
JP 2009-501510 A 1/2009

OTHER PUBLICATIONS

International Search Report and Written Opinion for PCT Patent App. No. PCT/JP2014/060660 (dated Jul. 22, 2014) with partial English language translation.
(Continued)

*Primary Examiner* — Jung Kim
(74) *Attorney, Agent, or Firm* — Kenealy Vaidya LLP

(57) ABSTRACT

Provided is an excessive length absorbing apparatus which absorbs the excess length of a primary resonant coil that is one of a pair of resonant coils which performs non-contact power supply via magnetic field resonance. A secondary hook in the excessive length absorbing apparatus hooks an excessive length portion of the primary resonant coil so as to hold the excess length portion of the primary resonant coil in a U-shape, and a holding member holds the secondary hook in a slidable manner.

4 Claims, 3 Drawing Sheets

(51) Int. Cl.
*H02J 50/12* (2016.01)
*B60K 6/22* (2007.10)
*H02J 17/00* (2006.01)
*H02J 5/00* (2016.01)
*H02J 7/00* (2006.01)
*H02J 7/02* (2016.01)

(52) U.S. Cl.
CPC ............ *H02J 7/0042* (2013.01); *H02J 7/025* (2013.01); *H02J 17/00* (2013.01); *H02J 50/12* (2016.02); *Y02T 10/7005* (2013.01); *Y02T 10/7072* (2013.01); *Y02T 90/122* (2013.01); *Y02T 90/14* (2013.01)

(58) Field of Classification Search
CPC ... B60K 6/22; Y02T 10/7072; Y02T 10/7005; Y02T 90/14; Y02T 90/122
See application file for complete search history.

(56) References Cited

U.S. PATENT DOCUMENTS

| | | | |
|---|---|---|---|
| 6,001,471 A * | 12/1999 | Bries | A47G 1/175 248/205.3 |
| 7,690,594 B2 * | 4/2010 | Takenoshita | G11B 23/107 242/332.4 |
| 2010/0052431 A1 | 3/2010 | Mita | |
| 2010/0244583 A1 | 9/2010 | Shimokawa | |
| 2014/0091635 A1 * | 4/2014 | Sugino | H01F 38/14 307/104 |
| 2014/0203661 A1 * | 7/2014 | Dayan | H01F 38/14 307/104 |

OTHER PUBLICATIONS

German Office Action for the related German Patent Application No. 11 2014 002 013.3 dated Dec. 30, 2016.

* cited by examiner

EXCESS-LENGTH-ABSORBING APPARATUS AND COIL UNIT

TECHNICAL FIELD

The present invention relates to an excessive length absorbing apparatus and a coil unit.

BACKGROUND ART

In recent years, attention is being attracted to wireless power supply that does not use power source codes and power transmitting cables as a power supply system that supplies to batteries mounted on, such as, hybrid cars or electrically-powered cars. A resonance type as one of this wireless power supply techniques is known (refer to PTL 1).

The wireless power supply adopting resonance type is configured with a power supply-side resonance circuit and a power receiving-side resonance circuit arranged apart to each other. The power supply-side resonance circuit and the power receiving-side resonance circuit are respectively configured with resonance coils and capacitors connected to the resonance coils.

A resonance frequency f of the power supply-side and the power receiving-side resonance circuit is represented by the following equation (1):

$$f=1/(2\pi \text{sqrt}(LC)) \tag{1}$$

where L denotes the inductance of the resonance coil, and C denotes the capacitance of the capacitor.

By having the power supply-side resonance circuit and the power receiving-side resonance circuit to be resonant, electric supply is enabled from the power supply-side to the power receiving-side in a contactless manner.

However, in the aforementioned power supply system, the resonance frequency f possibly deviated from the target value due to the scatter in the capacitance C of the capacitor and the inductance L of the resonance coil which occurs when manufacturing the products. Such a deviation from the target value in the resonance frequency f may have caused a decrease in transmitting efficiency. There is shown in FIG. 4 the transmitting efficiency of the power supply system observed when a variation ranging from 0% to ±10% occurs in the capacitance C of the capacitor.

As shown in the figure, when the capacitance C of the capacitor is at the target capacitance, the transmitting efficiency can be approximately 97.8%. However, as the difference between the capacitance C of the capacitor and the target capacitance is increased, the transmitting efficiency is decreased and when an error of −10% is produced, the transmitting efficiency is decreased to as low as 94.3%.

Then, it can be considered that a turn number of the resonance coil is made adjusted so as to target the resonance frequency f even if the variation is produced in the capacitance C of the capacitor. However, the excessive length is required in the resonance coil in order to make the adjustment of the turn number possible. In a state where the excessive length can be arbitrarily deformed, a floating inductance may be undesirably produced in accordance with the shape of the excessive length portion. Thus, even if the turn number is made adjusted, the shape of the excessive length portion is deformed afterward, and the floating inductance or a variation in the floating inductance may cause a repeated deviation from the target value in the resonance frequency f. Such a problem as this arises.

CITATION LIST

Patent Literature

Patent Literature 1: JP 2009-501510 T

SUMMARY OF INVENTION

Technical Problem

In view thereof, the present invention aims to provide an excessive length absorbing apparatus and a coil unit capable of absorbing the excessive lengths of coils with concurrent administration of the inductance.

Solution to Problem

One aspect of the present invention is an excessive length absorbing apparatus including: a hook adapted to hook an excessive length portion of a coil to hold the excessive length portion in a U-shape; and a holding member adapted to hold the hook in a manner that position of the hook is changeable.

Another aspect of the present invention is a coil unit including: at least one coil configuring at least one of a pair of resonance coils which performs non-contact power supply via magnetic field resonance, an electromagnetic induction coil which supplies electric power to a power supply-side of the pair of the resonance coils, and an electromagnetic induction coil to which power source is supplied from a power receiving-side of the pair of resonance coils; and the excessive length absorbing apparatus according to claim 1 that absorbs the excessive length (s) of the at least one coil.

A first preferred aspect of the present invention is the coil unit according to the another aspect of the present invention, further includes a turn number adjustment mechanism for adjusting a turn number of the coil.

A second preferred aspect of the present invention is the coil unit according to the first preferred aspect of the present invention, further including a base stage around which the coil is wound or on which the coil is mounted, wherein the turn number adjustment mechanism is configured with a turned-back portion provided by rewinding a portion of the coil, and wherein the base stage is provided with a plurality of guide members for hooking the coil to form the turned-back portion.

Advantageous Effects of Invention

As described above, according to the invention set forth in the one aspect or the another aspect of the present invention, since the excessive length portion is held in a U-shape by the above described excessive length absorbing apparatus, magnetic fluxes generated in a portion toward the hook and a returning portion from the hook counteract each other. Thereby, no floating inductance is generated at the excessive length portion. Further, the holding member holds the hook in a slidable manner, the hook can be provided at a position in accordance with a length of the excessive length portion. Thereby, the excessive length of the coil can be absorbed so as not to generate the floating inductance.

As described above, according to the first preferred aspect of the present invention, the turn number of the coil is adjusted to enable an adjustment of its impedance. Thereby, adjustment of the impedance can be performed without relying upon the variable capacitor, and a non-contact power supply can be implemented in high efficiency.

According to the second preferred aspect of the present invention, a shape of the turned-back portion can be maintained by a provision of the guide member.

DESCRIPTION OF EMBODIMENTS

Figure 1:
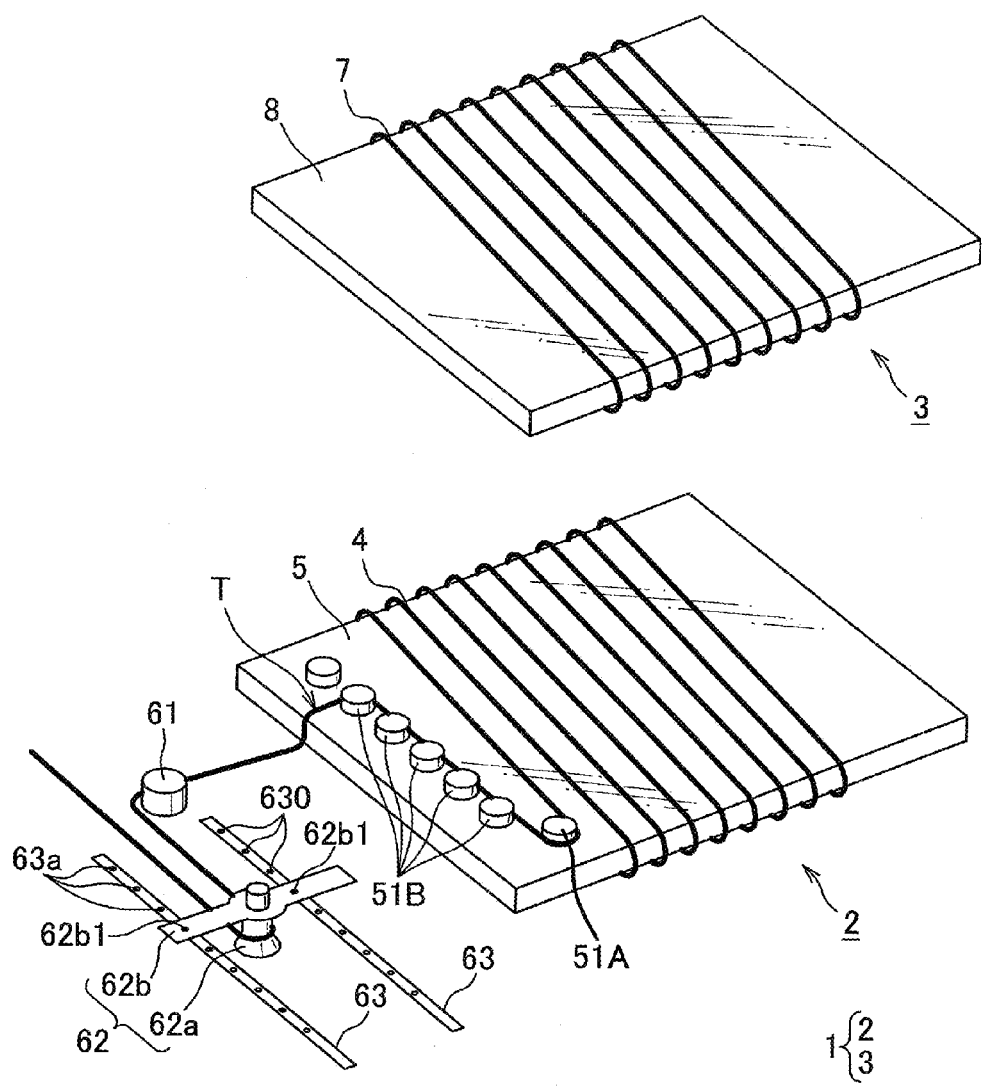
FIG. 1 is a view illustrating a power supply system into which an excessive length absorbing apparatus and a coil unit of the present invention are assembled.

Hereinafter, a power supply system of the present invention into which an excessive length absorbing apparatus and a coil unit are assembled is described with reference to FIG. 1. As illustrated in the drawing, a power supply system 1 includes a primary coil unit 2 mounted on a ground or the like in the power source supply system provided with an alternator power source, and supplying electric power source from the alternator power source (not illustrated) in a contactless manner, and a secondary coil unit 3 mounted on a motor vehicle, receiving an electric power in a contactless manner from the primary coil unit 2.

The primary coil unit 2 includes a primary resonance coil 4 connected to the alternator power source, a primary core 5 as a base stage around which the primary resonance coil 4 is wound, a primary capacitor (not illustrated) for adjusting resonance frequency, which is connected to the primary resonance coil 4, and an excessive length absorbing apparatus 6 absorbing the excessive length of the primary resonance coil 4. The primary resonance coil is equivalent to the resonance coil in the present invention.

The secondary coil unit 3 includes a secondary resonance coil 7 which is magnetic-field-resonantly interacted with the primary resonance coil 4, a secondary core 8 as a base stage around which the secondary resonance coil 7 is wound, and a secondary capacitor (not illustrated) for adjusting resonance frequency, which is connected to the secondary resonance coil 7.

The above described primary, secondary resonance coils 4, 7 are respectively wound in a helical manner around a flat plate-shaped primary and secondary cores 5, 8. The primary, secondary cores 5, 8 are arranged juxtaposedly in parallel with each other. Thus, the primary and secondary resonance coils 4, 7 are arranged in a manner that the axes of which are orthogonal to a facing direction with the primary and the secondary coil units 2, 3, that is, the primary and secondary resonance coils 4, 7 are arranged in the horizontal direction.

According to the power supply system 1 as aforementioned, when electrical power from the alternator power source is supplied to the primary resonance coil 4, the primary resonance coil 4 and the secondary resonance coil 7 are subjected to magnetic field resonance, and the electrical power is wirelessly supplied from the primary resonance coil 4 to the secondary resonance coil 7. After the electrical power has been supplied to the secondary resonance coil 7, the electrical power is then supplied to a load such as a battery.

Further, in the primary core 5, guide members 51A and 51B for forming a turned-back portion T as a turn number adjustment mechanism by hooking the primary resonance coil 4 are provided in plural. The plurality of guide members 51A and 51B is provided in a columnar shape protruding from the primary core 5. The guide member 51A is provided closer proximity to a central side of the primary resonance coil 4 than the other plurality of guide members 51B. The primary resonance coil 4 is hooked by the guide member 51A so that a portion of the primary resonance coil 4 is made rewound.

The remaining plurality of guide members 51B are juxtaposed in a line in the winding direction and are bent at 90 degrees by being hooked by the plurality of guide members 51B to be positioned apart from the turned-back portion T. A change of the guide member 51A enables an adjustment of the length of the turned-back portion T.

The turned-back portion T does not contribute to a function as a coil since the magnetic fluxes generated in a portion along the winding direction and in a portion along the rewinding direction that are adjacent to each other counteract each other. Thus, an increase of the turned-back portion T can lead to a decrease of the turn number of the primary resonance coil 4. By contrast thereto, a decrease of the turned-back portion T can lead to an increase of the turn number of the primary resonance coil 4.

The resonance frequency f between the primary and secondary resonance coils 4, 7 possibly unfavorably deviate from the target frequency due to the variation in capacitance of the primary and secondary capacitors, for example. In this embodiment, the length of turned-back portion is adjusted to change the turn number of the primary resonance coil 4 so as to eliminate the deviation of the resonance frequency f. Thereby, the resonance frequency f is adjusted to be coincident to the target frequency.

Figure 2:
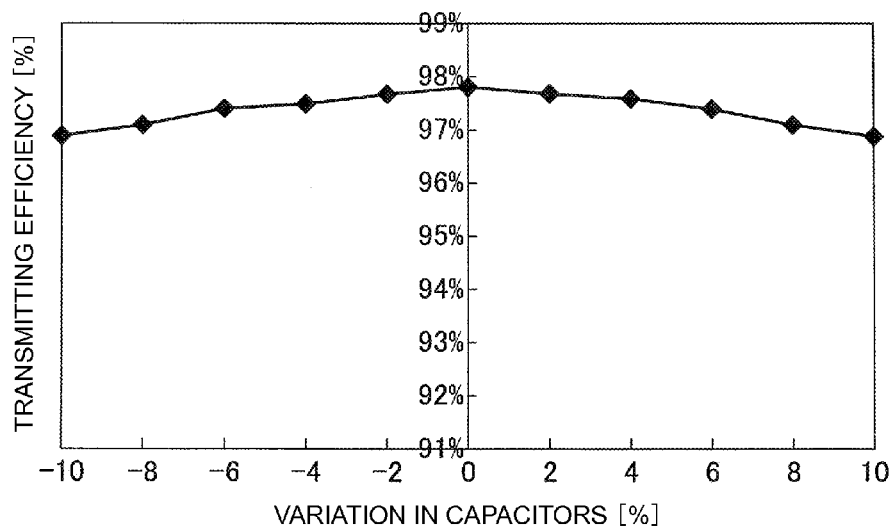
FIG. 2 is a graph showing a transmitting efficiency observed when the turn number of the primary resonance coil in the power supply system shown in FIG. 1 is adjusted in accordance with a variation ranging from 0% to ±10% having arisen in a capacitance of the capacitor.

FIG. 2 shows a transmitting efficiency observed when the turn number of the primary resonance coil in the power supply system shown in FIG. 1 is adjusted in accordance with the variation ranging from 0% to ±10% produced in the capacitance of the primary and secondary capacitors. By comparing FIG. 2 to FIG. 4, it is apparent that according to the conventional technique, the transmitting efficiency is decreased to as low as 94.3% when an error of −10% is produced, to the contrary, according to this embodiment, the transmitting efficiency can be maintained at as high as approximately 97% even if the error of −10% is produced. Incidentally, a shift in value of the resonance frequency f is likely to occur due to not only a variation of the capacitance of the primary and secondary capacitors, but also the variation of a distance between the primary and secondary coil units 2, 3 or a variation in manufacturing the primary and secondary resonance coils 4, 7.

As descried above, an excessive length is provided to some extent at the connection position between the primary resonance coil 4 and the terminal fitting (not illustrated) provided at a terminal portion of the primary resonance coil 4 in order to adjust the length of the turned-back portion T. The excessive length absorbing apparatus 6 is adapted to absorb the excessive length portion of the primary resonance coil 4 and includes a primary hook 61, a secondary hook 62 that functions as a hook hooking the excessive length portion of the primary resonance coil 4 to hold the excessive length portion of the primary resonance coil 4 in a U-shape, and a holding member 63 holding the secondary hook 62 in a manner that the position of the secondary hook 62 is changeable.

The primary hook 61 is provided in a columnar shape, for example. The primary hook 61 is affixed in a vicinity of the primary core 5 and hooks the primary resonance coil 4 to bend the terminal portion of the primary resonance coil 4 at 90 degrees so as to extend the terminal portion in an axial direction of the primary resonance coil 4.

The secondary hook 62 includes a hook body 62*a* and a fixed portion 62*b*. The hook body 62*a* is provided in an approximate columnar shape, and the primary resonance coil 4 in the axial direction is hooked by the primary hook 61. The primary resonance coil 4 hooked by the hook body 62*a* is returned toward the primary hook 61 again. The fixed portion 62*b* is attached to the hook body 62*a* and is formed in a plate-like shape extending toward the holding member 63.

The holding members 63 are provided in the axial direction and are arranged in a pair state as well as in a parallel state to each other. Between the pair of holding members 63, there is positioned the hook body 62*a* and there is mounted the fixed portion 62*b*. In this holding member 63, there are provided a plurality of screw holes 63*a* in the axial direction. A screw hole 62*b*1 is also provided in the fixed portion 62*b*. After the screw hole 62*b*1 provided in the fixed portion 62*b* is made communicated to the one of the screw holes 63*a* provided in the holding member 63, they are joined to each other by screwing together. By choosing one from the screw holes 63*a* provided in the fixed portion 62*b*, the secondary hook 62 is position-changeably held in the axial direction.

Since the excessive length portion is held in a U-shape by the above described excessive length absorbing apparatus 6, the magnetic fluxes generated in the portion from the primary hook 61 to the secondary hook 62, and a returning portion from the secondary hook 62 counteract each other. Thereby, no floating inductance is generated at the excessive length portion. Further, the holding member 63 holds the secondary hook 62 in the axial direction in a manner that the position of the secondary hook 62 is unchanged. Thereby, even if the length of the excessive length portion is changed by the adjustment of the length of the turned-back portion T, the secondary hook 62 can be provided at a position in accordance with the length of the excessive length portion. Thus, the excessive length of the primary resonance coil 4 can be absorbed so as not to produce a floating inductance.

According to the above described embodiment, by providing the turned-back portion T, the turn number of the primary resonance coil 4 can be optimized to adjust its impedance. Thereby, an adjustment of the impedance can be implemented without relying upon the variable capacitor, and a non-contact power supply in high efficiency can be enabled. Furthermore, by providing the guide members 51A and 51B which constitute the turned-back portion T, a shape of the turned-back portion T can be easily maintained.

According to the above described embodiment, although the holding member 63 is provided in the axial direction of the primary resonance coil 4 and the holding member 63 holds the secondary hook 62 in a manner that the secondary hook 62 is position-changeable, they are not limited thereto. The holding member 63 only has to be capable of changing the length of the excessive length portion held in a U-shape. For example, the holding member 63 may be provided in the winding direction.

According to the above described embodiment, although the plurality of guide member 51A and 51B are provided in a convex shape in the primary core 5, they are not limited thereto. For example, the turned-back portion T may be provided by fitting the primary resonance coil 4 into a guide member which is formed by a plurality of U-shaped grooves having different lengths provided at the primary core 5.

According to the above described embodiment, although the primary hook 61 and the secondary hook 62 are provided in a columnar shape, they are not limited thereto. The primary hook 61 and the secondary hook 62 only have to be capable of hooking the primary resonance coil 4. For example, they may be provided in hook shapes.

According to the above described embodiment, although the turned-back portion T is provided at the primary resonance coil 4 and the excessive length absorbing apparatus 6 is provided at the primary coil unit 2, the present invention is not limited thereto. In a case where the turned-back portion T is also provided at the secondary resonance coil 7, the excessive length absorbing apparatus can also be provided at the secondary coil unit 3.

According to the above described embodiment, although in the primary core 5, multiple guide members 51B are provided in a juxtaposed manner, they are not limited thereto. For example, the length of the turned-back portion T may be made adjusted by optimizing the position of the guide member 51B. The guide member 51B is provided in a singular and a moveable manner.

According to the above described embodiment, although the primary and secondary resonance coils 4, 7 are helically wound around the primary core 5 and the secondary core 8, the shapes of the primary and secondary resonance coils 4, 7 are not limited thereto. The primary and secondary resonance coils 4, 7 may be wound in a spiral manner as shapes of them.

According to the above described embodiment, although the axes of the primary and secondary resonance coils 4, 7 are arranged in the horizontal direction, they are not limited thereto. The primary and secondary resonance coils 4, 7 may be arranged in a coaxial manner in relation to each other.

Figure 3:
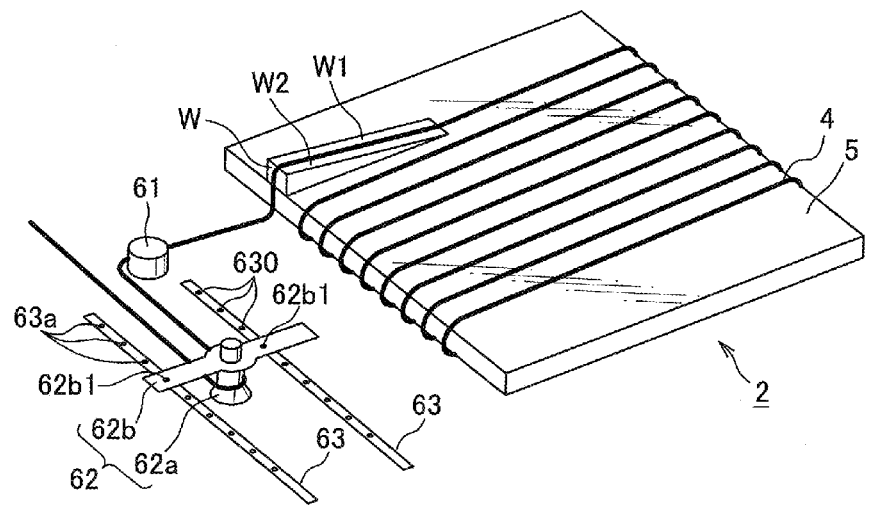
FIG. 3 is a view illustrating another embodiment of the power supply system into which an excessive length absorbing apparatus and a coil unit are assembled.
Figure 4:
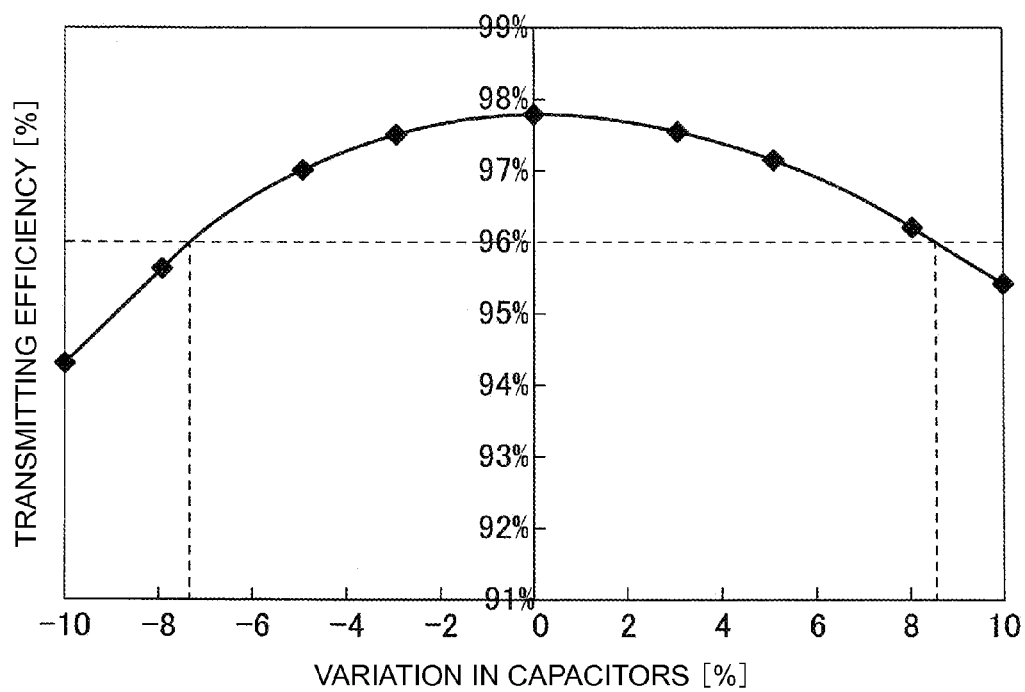
FIG. 4 is a graph showing a transmitting efficiency observed when the turn number of the primary resonance coil in the conventional power supply system shown in FIG. 1 is adjusted in accordance with the variation ranging from 0% to ±10% having arisen in the capacitance of the capacitor.

According to the above described embodiment, although described in a case where the turned-back portion T is provided as the turn number adjustment mechanism, the present invention is not limited thereto. For example, an excessive length absorbing apparatus may be provided at an entity which adjusts the turn number by the wedge W representing the turn number adjustment mechanism as shown in FIG. 3.

The wedge W is mounted on the primary core 5 and provided in an almost box-shaped. The wedge W is provided in the winding direction of the primary resonance coil 4 in a longitudinally-shape. The wedge W is provided with an inclined surface W1 inclined so as to be gradually higher toward the first end portion of the primary resonance coil 4. The inclined surface W1 is provided with a linearly-shaped housing groove W2 which accommodates the first end portion of the primary resonance coil 4, and the first end portion of the primary resonance coil 4 is accommodated within the linearly-shaped housing groove W2.

The one end portion of the primary resonance coil 4, which is a portion mounted on the wedge W is positioned apart from the other portions. Hence, the portion of the primary resonance coil 4 mounted on the wedge W does not serve to a function of the coil. Thus, when the wedge W is moved to a side apart from the first end portion of the primary resonance coil 4, the end portion length of the primary resonance coil 4 mounted on the wedge W is increased. Thereby, the turn number of the primary resonance coil 4 is allowed to decrease. In this situation, the excessive length portion of the primary resonance coil 4 is made shortened.

By contrast thereto, when the wedge W is moved to the one end portion of the primary resonance coil 4, an end portion length of the primary resonance coil 4 mounted on the wedge W is decreased, thereby, the turn number of the primary resonance coil 4 is allowed to increase. In this situation, the excessive length portion of the primary resonance coil 4 is made elongated.

As described above, since the length of the excessive length portion is changed by the turn number adjustment of the wedge W, by locating the secondary hook 62 in a position in accordance with the length of the excessive length portion, the excessive length of the primary resonance coil 4 can be absorbed avoiding a production of a floating inductance.

According to the above described embodiment, although the excessive length absorbing apparatus 6 is provided in order to absorb the excessive lengths of the resonance coils 4, 7, the present invention is not limited thereto. For example, in a case where the primary resonance coil 4 is not directly connected to the alternator power source and is therefore power supplied from the alternator power source via electromagnetic induction with the primary electromagnetic induction coil, the excessive length absorbing apparatus 6 may be provided to absorb the excessive length of the primary electromagnetic induction coil.

Further, in a case where the secondary resonance coil 7 is not directly connected to a load such as a battery, and supplies a power source to the load via electromagnetic induction with the secondary electromagnetic induction coil, the excessive length absorbing apparatus 6 may be provided to absorb the excessive length of the secondary electromagnetic induction coil. In the primary and secondary electromagnetic induction coils, a member such as a turned-back portion T or a wedge W is likely to be provided to adjust its impedance.

Incidentally, the above descried embodiments merely show a representative embodiment of the present invention, thus, the present invention is not limited thereto. That is, the present invention can be implemented in various modifications without departing from the gist of the present invention.

Reference Signs List

| | |
|---|---|
| 2 | primary coil unit (coil unit) |
| 3 | secondary coil unit (coil unit) |
| 4 | primary resonance coil (resonance coil) |
| 5 | primary core (base stage) |
| 7 | secondary resonance coil (resonance coil) |
| 8 | secondary core (base stage) |
| 6 | excessive length absorbing apparatus |
| 51A | guide member |
| 51B | guide member |
| 62 | secondary hook (hook) |
| 63 | holding member |
| T | turned-back portion (turn number adjustment mechanism) |
| W | wedge (turn number adjustment mechanism) |

The invention claimed is:

1. A coil unit comprising:
at least one coil configuring at least one of a pair of resonance coils which performs non-contact power supply via magnetic field resonance, an electromagnetic induction coil which supplies electric power to a power supply-side of the pair of the resonance coils, and an electromagnetic induction coil to which power source is supplied from a power receiving-side of the pair of resonance coils; and
an excessive length absorbing apparatus that absorbs an excessive length portion of the at least one coil, the excessive length absorbing apparatus including:
a primary hook configured to hook the at least one coil;
a secondary hook configured to hook the excessive length portion of the at least one coil to hold the excessive length portion in a U-shape; and
a holding member configured to hold the secondary hook in a manner that position of the secondary hook is slidable relative to the primary hook in a longitudinal direction of the U-shape to absorb the excessive length portion.

2. The coil unit according to claim 1, further comprises a turn number adjustment mechanism for adjusting a turn number of the at least one coil.

3. The coil unit according to claim 2, further comprising a base stage around which the at least one coil is wound or on which the at least one coil is mounted, wherein
the turn number adjustment mechanism is configured with a turned-back portion provided by rewinding a portion of the at least one coil, and wherein
the base stage is provided with a plurality of guide members for hooking the at least one coil to form the turned-back portion.

4. A coil unit comprising:
at least one coil configuring at least one of a pair of resonance coils which performs non-contact power supply via magnetic field resonance, an electromagnetic induction coil which supplies electric power to a power supply-side of the pair of the resonance coils, and an electromagnetic induction coil to which power source is supplied from a power receiving-side of the pair of resonance coils;
a turn number adjustment mechanism for adjusting a turn number of the at least one coil;
a base stage around which the at least one coil is wound or on which the at least one coil is mounted, wherein
the turn number adjustment mechanism is configured with a turned-back portion provided by rewinding a portion of the at least one coil, and
the base stage is provided with a plurality of guide members for hooking the at least one coil to form the turned-back portion; and
an excessive length absorbing apparatus that absorbs an excessive length portion of the at least one coil, the excessive length absorbing apparatus including:
a hook configured to hook the excessive length portion of the at least one coil to hold the excessive length portion in a U-shape; and
a holding member configured to hold the hook in a manner that position of the hook is slidable in a longitudinal direction of the U-shape.

* * * * *